(12) United States Patent
Sugita et al.

(10) Patent No.: US 8,179,497 B2
(45) Date of Patent: May 15, 2012

(54) LIQUID CRYSTAL DISPLAY DEVICE

(75) Inventors: Tatsuya Sugita, Takahagi (JP); Shinichi Komura, Mobara (JP); Tetsuya Nagata, Hitachinaka (JP); Masaya Adachi, Hitachi (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 921 days.

(21) Appl. No.: 12/192,171

(22) Filed: Aug. 15, 2008

(65) Prior Publication Data

US 2009/0066880 A1 Mar. 12, 2009

(30) Foreign Application Priority Data

Sep. 7, 2007 (JP) ................................ 2007-233118

(51) Int. Cl.
*G02F 1/1335* (2006.01)
(52) U.S. Cl. ............. 349/62; 349/64; 349/95; 349/114; 362/607
(58) Field of Classification Search .................... 349/64, 349/62, 95; 362/607
See application file for complete search history.

(56) References Cited

U.S. PATENT DOCUMENTS

| | | | |
|---|---|---|---|
| 5,359,440 A * | 10/1994 | Hamada et al. ................. | 349/8 |
| 6,002,459 A | 12/1999 | Kaise et al. | |
| 6,643,067 B2 * | 11/2003 | Miyamae et al. ............. | 359/619 |
| 2003/0214615 A1 | 11/2003 | Colgan et al. | |
| 2004/0233354 A1 * | 11/2004 | Uehara et al. ................. | 349/113 |
| 2005/0099822 A1 | 5/2005 | Choi et al. | |

FOREIGN PATENT DOCUMENTS

| | | |
|---|---|---|
| JP | 8-82702 | 3/1996 |
| JP | 10-161097 | 6/1998 |
| JP | 2005-148748 | 6/2005 |
| JP | 2005-275142 | 10/2005 |
| JP | 3931989 | 3/2007 |

* cited by examiner

*Primary Examiner* — Richard Kim
(74) *Attorney, Agent, or Firm* — Antonelli, Terry, Stout & Kraus, LLP.

(57) ABSTRACT

An object of the present invention is to provide a simply configured liquid crystal display device capable of providing a high front luminance when light obliquely enters a micro lens array. The liquid crystal display device comprises: a pair of polarizing plates which sandwich a pair of substrates; a liquid crystal layer sandwiched by the pair of substrates; transmission openings formed in a pixel to limit the quantity of light which penetrates the liquid crystal layer; condensing elements formed on the side of one of the substrates, opposite to the side on which the liquid crystal layer is disposed, to condense light to the transmission openings; and a planar light-emitting element which emits light to be applied to the condensing elements; wherein the light to be emitted from the planar light-emitting element forms a certain angle with respect to its perpendicular when emitted; and wherein the position of the transmission opening is relatively shifted with respect to that of the condensing element so as to increase the quantity of light which penetrates the transmission opening, in association with the light-emitting direction of the planar light-emitting element.

17 Claims, 9 Drawing Sheets

LIQUID CRYSTAL DISPLAY DEVICE

BACKGROUND OF THE INVENTION

1. Field of the Invention

The present invention relates to a liquid crystal display device which uses a transmissive or transflective liquid crystal layer.

2. Description of the Related Art

JP-A-2005-275142 discloses a display panel which includes a micro lens array composed of a plurality of micro lenses, each having a flat top, disposed on the backlight side of a liquid crystal display panel in order to expand the viewing angle without reducing the front luminance.

Japanese patent No. 3931989 discloses a display device adapted to improve the efficiency of utilization of light from the illumination device to increase the luminance. This display device includes an illumination device, a display panel having a plurality of pixels, and condensing elements disposed between the illumination device and the display panel. The condensing elements are disposed in association with a transmissive region of the pixels and a converging point of the light emitted from the illumination device is adapted to be formed at the side closer to a viewer than at the side of a display medium layer of the display panel.

As described in these conventional techniques, when a micro lens is applied to a display device, it is necessary to take into consideration the viewing angle, the front luminance, and the efficiency of utilization of light.

The liquid crystal display device disclosed in JP-A-2005-275142 was devised to improve the viewing angle and the front luminance. JP-A-2005-275142 describes an output distribution in which, when the angle seen from the front changes, the luminance of the light having penetrated the liquid crystal display panel changes rapidly and then its change moderates. This is because light which penetrated the flat portion is superimposed with light which penetrated a curved surface of the micro lens. As described above, there arises a problem that the luminance largely changes when the viewing angle is changed and also further problem is that it is difficult to form a micro lens having a flat top.

SUMMARY OF THE INVENTION

An object of the present invention is to provide a simply configured liquid crystal display device capable of providing a higher front luminance and a wide range of viewing angles when light enters condensing elements, especially when light obliquely enters condensing elements.

To attain the above-mentioned object, the present invention is embodied as described below.

In one aspect of the present invention, a liquid crystal display device comprises: a pair of polarizing plates which sandwich a pair of substrates; a liquid crystal layer sandwiched by the pair of substrates; transmission openings formed in a pixel to limit the quantity of light which penetrates the liquid crystal layer; condensing elements formed on the side of one of the substrates, opposite to the side on which the liquid crystal layer is disposed, to condense light to the transmission openings; and a planar light-emitting element which emits light to be applied to the condensing elements; wherein the light to be emitted from the planar light-emitting element forms a certain angle with respect to its perpendicular when emitted; and wherein the position of the transmission opening is relatively shifted with respect to that of the condensing element so as to increase the quantity of light which penetrates the transmission opening, in association with the light-emitting direction of the planar light-emitting element.

In another aspect of the present invention, a liquid crystal display device comprises: a pair of polarizing plates which sandwich a pair of substrates; a liquid crystal layer sandwiched by the pair of substrates; transmission openings formed in a pixel to limit the quantity of light which penetrates the liquid crystal layer; condensing elements formed on the side of one of the substrates, opposite to the side on which the liquid crystal layer is disposed, to condense light to the transmission openings; and a planar light-emitting element which emits light to be applied to the condensing elements; wherein the planar light-emitting element is composed of a plurality of prism sheets having different prism bottom angles; and wherein the position of the transmission opening is relatively shifted with respect to that of the condensing element so as to increase the quantity of light which penetrates the transmission opening.

In still another aspect of the present invention, a liquid crystal display device comprises: a pair of polarizing plates which sandwich a pair of substrates; a liquid crystal layer sandwiched by the pair of substrates; transmission openings formed in a pixel to limit the quantity of light which penetrates the liquid crystal layer; a liquid crystal display element which includes condensing elements formed on the side of one of the substrates, opposite to the side on which the liquid crystal layer is disposed, to condense light to the transmission openings; and a planar light-emitting element which emits light to be applied to the condensing elements; wherein the light to be emitted from the planar light-emitting element forms a certain angle with respect to its perpendicular when emitted; and wherein the light-emitting angle of the liquid crystal display element is smaller than that of the planar light-emitting element.

In a further aspect of the present invention, a liquid crystal display device comprises: a pair of polarizing plates which sandwich a pair of substrates; a liquid crystal layer sandwiched by the pair of substrates; transmission openings formed in a pixel to limit the quantity of light which penetrates the liquid crystal layer; condensing elements formed on the side of one of the substrates, opposite to the side on which the liquid crystal layer is disposed, to condense light to the transmission openings; and a planar light-emitting element which emits light to be applied to the condensing elements; wherein, when T denotes the thickness of one of the substrates, disposed on the side of the planar light-emitting element; and f', the distance from a best condensing position, at which the diameter of a condensed light spot is minimized when parallel light perpendicularly enters the condensing element, to the condensing element, T/f' is between 0.55 and 0.8 and a wider viewing angle is provided than when T/f' is 1.

In a still further aspect of the present invention, a liquid crystal display device comprises: a pair of polarizing plates which sandwich a pair of substrates; a liquid crystal layer sandwiched by the pair of substrates; transmission openings formed in a pixel to limit the quantity of light which penetrates the liquid crystal layer; condensing elements formed on the side of one of the substrates, opposite to the side on which the liquid crystal layer is disposed, to condense light to the transmission openings; a planar light-emitting element which emits light to be applied to the condensing elements; and a light diffusion layer disposed between the transmission openings and the condensing elements.

The present invention is makes it possible to provide a simply configured liquid crystal display device capable of providing a high front luminance and a wide range of viewing angles when light enters condensing elements, especially when light obliquely enters condensing elements.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

A first embodiment of the present invention will be explained below with reference to FIGS. 1 to 13.

Figure 1:
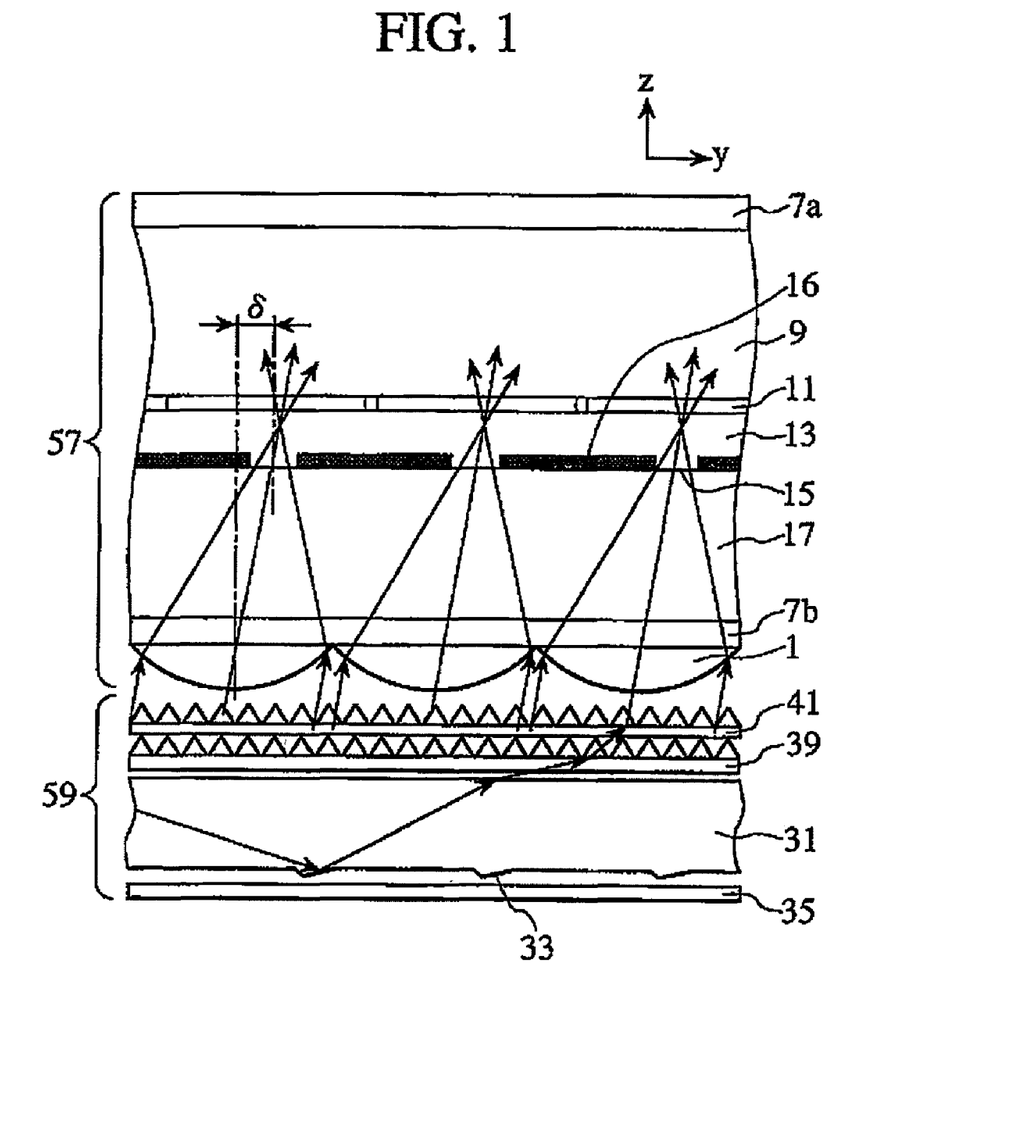
FIG. 1 is a sectional view of a first embodiment of a liquid crystal display device according to the present invention.

FIG. 1 is a sectional view showing a planar light-emitting element and a liquid crystal display element included in a liquid crystal display device. Reference numeral 57 denotes a transflective liquid crystal display element having a reflective portion and a transmissive portion within the same pixel, as a liquid crystal display element. Reference numeral 59 denotes a backlight which irradiates the liquid crystal display element 57 with light from a light source, as a planar light-emitting element.

Light emitted from a light source (disposed on the left-hand side of FIG. 1, not shown) repeatedly reflects and propagates within a light guide plate 31 which is a light guide element. The light guide plate 31 is formed with a reflecting groove 33 below the plate 31, i.e., on the side opposite to the liquid crystal display element 57 (on the side opposite to the light extraction side). A reflecting sheet 35 is provided on the side (lower side) opposite to the light extraction side with respect to the reflecting groove 33. The propagation angle of the light reflected by a reflecting groove 33 is increased in the light guide plate 31 and thereby an incident angle to the boundary surface of the light guide plate 31 becomes small. A part of the light which entered the boundary surface with an incident angle smaller than the critical angle on the boundary surface of the light guide plate 31 is emitted from the light guide plate 31 toward the side of the liquid crystal display element 57 or the side of the reflecting sheet 35. The light which penetrated toward the side of the reflecting sheet 35 penetrates the light guide plate 31, reflects off the reflecting sheet 35, and then is extracted on the side of the liquid crystal display element 57. The output angle distribution of the light emitted from the light guide plate 31 can be controlled by the shape of the reflecting groove 33. With the present embodiment, it is desirable to reduce the output angle distribution.

On the side of the liquid crystal display element 57 of the light guide plate 31, a first prism sheet 39 and a second prism sheet 41 are stacked in this order from the side of the light guide plate 31. These prism sheets direct the light from the backlight 59 toward the front, thus improving the directivity (reducing the light spread angle). The directivity is improved mainly by the first prism sheet 39. The emitted light is directed to the front by the first prism sheet 39 and the second prism sheet 41.

The liquid crystal display element according to the present embodiment includes: a pair of substrates (an upper substrate 9 and a lower substrate 17); a pair of polarizing plates (polarizing plates 7a and 7b) which sandwich the pair of substrates; a liquid crystal layer 13 and transmission openings 15 disposed between the pair of substrates; and lenticular lenses (condensing element) 1 disposed between the lower substrate 17 and the backlight 59 and condensing the light emitted from the backlight 59 to the transmission openings 15. Condensing the light to the transmission openings 15 by use of the lenticular lenses 1 improves the quantity of the light which penetrates the transmission openings 15. When the light which penetrated the transmission openings 15 penetrates the liquid crystal layer 13, a color filter 11, the upper substrate 9, and a polarizing plate 7a, the permeability is switched and an image is displayed.

When light is condensed by a micro lens, if the lower substrate 17 is formed to have a thinner thickness, the quantity of light which penetrates the transmission openings 15 becomes larger and the viewing angle becomes larger. In contrast, if the lower substrate 17 is formed to be thicker, the front luminance becomes higher; therefore, it is desirable to determine the thickness of the lower substrate 17 according to characteristics of an intended display device.

It is possible to configure a transflective liquid crystal display device by providing reflective display sections 16 in addition to the transmission openings 15. In this case, the liquid crystal display element 57 may be configured in the same manner as an ordinary transflective liquid crystal display element. In the case of active matrix drive, a thin-film transistor (TFT) may be provided at each of the reflective display sections 16 so that switching of the liquid crystal layer is performed.

With the present embodiment, the lenticular lens 1 is formed on a polarizing plate 7b through printing. After print-based patterning of ultraviolet-ray hardening resin aligned with the transmission openings 15, on the polarizing plate 7b, the resin is irradiated with ultraviolet ray so as to be hardened, thereby forming a lens. Since the polarizing plate 7b is attached to the lower substrate 17 and the lens is formed thereon, the number of boundary surfaces in contact with air is reduced making it possible to reduce surface reflection and accordingly increase the permeability. Further, a light that has passed through a lens then passes through the polarizing plate 7b, thus increasing the contrast of the liquid crystal display element 57. However, the polarizing plate 7b may be provided between the liquid crystal layer 13 and the backlight 59, for example, between the backlight 59 and the lenticular lens 1. In this case, it is desirable to fix the polarizing plate 7b so as not to get dust between the polarizing plate 7b and the lenticular lens 1. Further, a method of forming a lens is not limited and it is preferable to form it by use of the 2P (Photo Polymer) method, photolithography, printing with an ink-jet printer, or the like.

Figure 2:
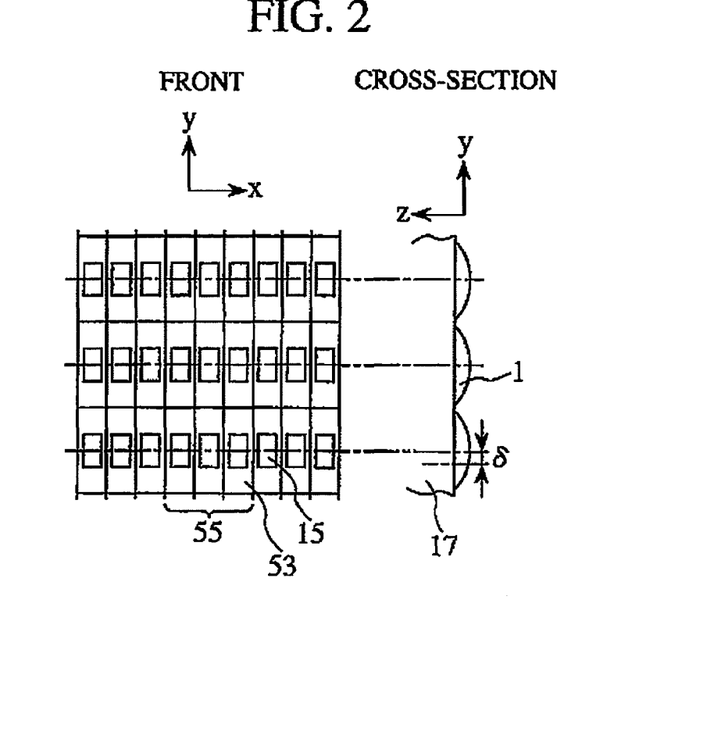
FIG. 2 is a view illustrating pixels and a lenticular lens laid out according to the first embodiment of the present invention.

FIG. 2 is a view illustrating the laid out of pixels and the lenticular lenses 1. Pixels 55 are periodically arranged in a matrix form. Each pixel is split into sub pixels 53 for three colors (RGB). The sub pixels 53 are arranged in the horizontal direction (row direction or x-axis direction in FIG. 2), i.e., in the lateral direction of the screen. Therefore, the lenticular lenses 1 each have a curvature in the y-axis direction, and are longitudinally disposed in the x-axis direction. The light having a strong y-axis directional directivity emitted from the backlight 59 is condensed by use of the lenticular lens 1.

Figure 3:
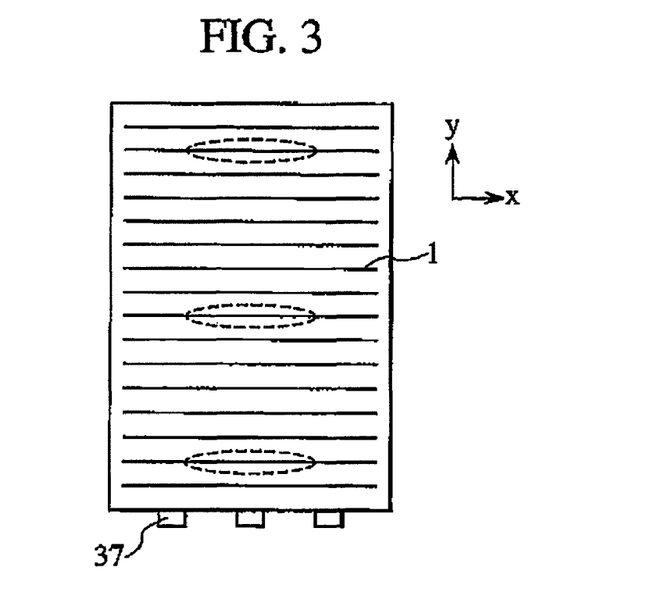
FIG. 3 is a front elevational view of the first embodiment of the present invention.

FIG. 3 is a front elevational view of an image display element. Ellipses shown with dotted lines in the FIG. 3 conceptually show a state of the directivity from the backlight 59, where the lenticular lens 1 provides a strong y-axis directional directivity, in which light is condensed, and a wide range of viewing angles in the x-axis direction. It is desirable for an image display device that the x-axis direction having a wide range of viewing angles be set as the lateral direction, and the y-axis direction having a strong directivity as the vertical direction. Therefore, light is condensed using the lenticular lenses 1 in alignment with the transmission openings 15 for the sub pixels arranged in the x-axis direction. It is desirable in the y direction in which light is not condensed by the lenticular lenses that the spread angle of the light emitted from the backlight 59 be adjusted so that a desired viewing angle can be obtained.

When light is condensed using the lenticular lenses 1 as a condensing element in this way, it is desirable in an orthogonal coordinate system that there be a strong directivity uniformly in one axis direction and a wide output angle distribution in another (vertical) axis direction.

Although a lens generally has a spherical surface (a circular arc in the case of a lenticular lens), an aspheric lens may be used as the lenticular lens 1 in order to efficiently condense light to the transmission opening 15. Especially, when the lower substrate 17 is thin and the curvature radius of the lenticular lens 1 small, it is effective to use an aspheric lens.

In order that the lenticular lens 1, a condensing element, functions to increase the quantity of light which penetrates the transmission opening 15, it is necessary to decrease the spread angle of the light emitted from the backlight 59 to ±7° or less, preferably to ±5° or less. The present embodiment has the improved directivity in one-axis direction by using the prism sheets.

Figure 4:
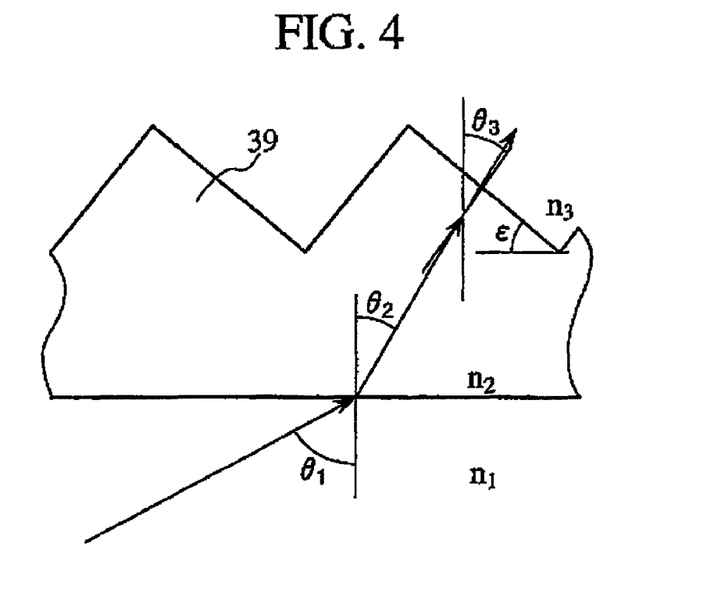
FIG. 4 is a sectional view of a prism sheet according to the first embodiment of the present invention.

The effect of improvement in directivity by use of the first prism sheet 39 will be explained below with reference to FIG. 4. When $n_2$ denotes the refractive index of a prism sheet; $n_1$, the refractive index of a medium on the incidence side; $n_3$, the refractive index of a medium on the output side; $\theta_1$, the light incidence angle with respect to the z-axis direction; $\theta_3$, the light output angle with respect to the z-axis direction; and $\epsilon$, the angle of a prism facet (prism bottom angle) at which the light from the light guide element is inputted, the following relation is obtained from the Snell's law:

$$n_1 \sin \theta_1 = n_2 \sin \theta_2 \qquad \text{[Equation 1]}$$

$$n_2 \sin(\epsilon - \theta_2) = n_3 \sin(\epsilon - \theta_3) \qquad \text{[Equation 2]}$$

If the angle of the prism facet is set to $\epsilon$ ($\theta_3$ nearly equals 0) so that the main light is outputted substantially perpendicularly to the prism facet, when light having a spread angle $\Delta\theta_1$ enters the prism facet, the spread angle of the output angle, $\Delta\beta_3$, is represented by the following equation when $\Delta\theta_1$ is small:

$$\Delta\theta_3 = \frac{n_1 n_3 \cos\theta_1}{\sqrt{n_2^2 - (n_1 \sin\theta_1)^2}} \Delta\theta_1 \qquad \text{[Equation 3]}$$

For example, when air is used as media having a refractive index of $n_1$ and $n_3$, a relation $\Delta\theta_3 < \Delta\theta_1$ results, which indicates that the first prism sheet 39 has an effect of improving the directivity. The larger $\theta_1$ or $n_2$, the greater becomes the effect.

However, if $\theta_1$ or $n_2$ is increased, reflection when the light enters a prism sheet becomes larger and the quantity of light which penetrates the prism sheet is decreased. It is desirable to determine the incident angle and the refractive index taking into consideration the thus-improved directivity and reduction in the quantity of transmitted light caused by reflection. The prism angle $\epsilon$ is desirably determined in Equations (1) and (2) so that $\theta_3$ nearly equals 0 for the direction of light having the highest intensity. In order not to interrupt the light in the direction having a high luminance for another facet of the first prism sheet 39, it is desirable to set the apex angle of the first prism sheet 39 to a value close to 90°. Therefore, each of the prisms on the first prism sheet 39 is characterized in having an asymmetrical shape having two different bottom angles.

Figure 5:
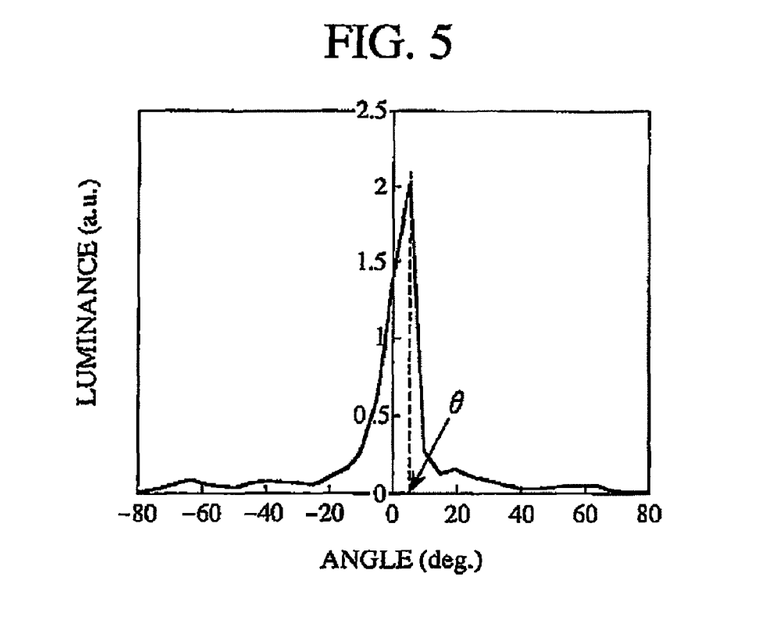
FIG. 5 is a diagram a viewing angle distribution of backlight output light according to the first embodiment of the present invention.

In this way, in order to improve the directivity of the emitted light, the light emitted from the first prism sheet 39 will be outputted obliquely with respect to the perpendicular of the output facet of the backlight 59. Then, the light is adapted to direct toward the front by use of the second prism sheet 41. However, a second prism sheet 41 is used not to set a luminance peak toward the front direction but to set a luminance peak slightly aslant from the light traveling direction, so that the directivity and the peak luminance are increased rather. FIG. 5 shows the y-directional output angle distribution of the backlight 59 used for the present embodiment. In accordance with the present embodiment, light is emitted from the backlight 59 so that the luminance peak inclines by about 5° in the light traveling direction (y direction) from the LED. In this way, it is necessary to determine lens specifications, arrangements, etc., while the quantity of transmitted light, the front luminance, and the viewing angle are taken into consideration in association with the light which obliquely enters the lens.

The following describes a relation between the quantity of light which penetrates a transmission opening 15 and lens specifications. An object between the lenticular lens 1 and the transmission openings 15 is represented by the lower substrate 17 in the following explanation; however, if the polarizing plate 7b is provided therebetween as is the case with the present embodiment, it may be possible to replace the thickness T of the lower substrate 17 with the thickness $T_p$ of the polarizing plate 7b as follows:

$$n_1(T/n_1 + T_p/n_p) \quad \text{[Equation 4]}$$

where $T_p$ denotes the thickness of the polarizing plate; and $n_p$, the refractive index thereof.

The quantity of the light which penetrates the transmission opening 15 is maximized by bringing the best condensing position, at which the diameter of a light spot condensed by a lens is minimized, to the transmission opening 15. The best spot position, at which the diameter of the light spot is minimized, can be determined by use of simulation such as ray tracing. In accordance with the present invention, however, the lens is irradiated with light that is almost equivalent to parallel light and has a strong directivity. Therefore, the best spot position is determined based on an analytical approach if a spherical lens is used. A paraxial focal distance of the planoconvex spherical lens (having a lens refractive index $n_1$ and a curvature radius R) used for the present embodiment is represented by the following equation:

$$f = \frac{1}{n_1 - 1} R \quad \text{[Equation 5]}$$

Figure 6:
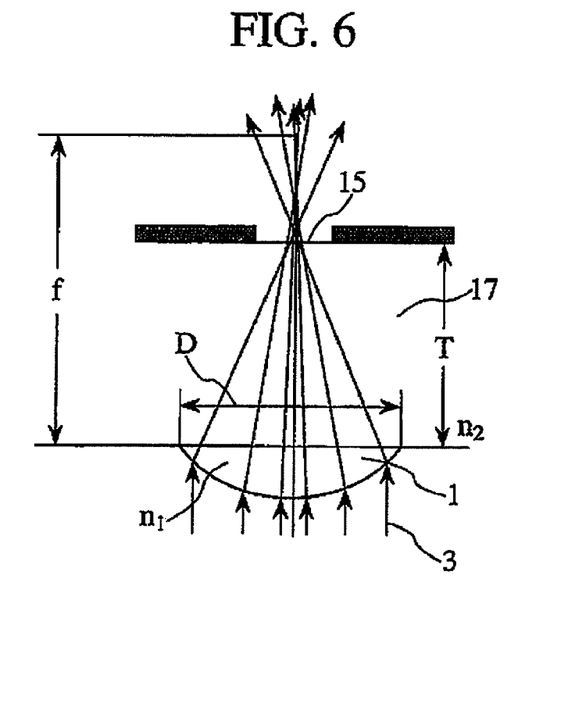
FIG. 6 is a diagram of assistance in explaining the position of a transmission opening according to the first embodiment of the present invention.

In the case of a spherical lens, however, the best image point position, at which the diameter of a condensed light spot is minimized, shifts from the paraxial focus toward the lens side due to the spherical aberration of the lens, as shown in FIG. 6. The best image point distance f' for an image formed in the lower substrate 17 when a parallel light enters the lens is represented by the following equation:

$$f' = n_2 f - \frac{3}{8} \frac{n_1^2}{n_2(n_1 - 1)^3} R \left(\frac{D}{2f}\right)^2 \quad \text{[Equation 6]}$$

where $n_2$ denotes the refractive index of the lower substrate 17; and D, the lens diameter (lens width in the case of a lenticular lens).

Therefore, if the thickness of the lower substrate 17 is predetermined, it is possible to maximize the quantity of transmitted light by determining the lens curvature radius R and the lens width D so that the best image point position of the lens comes to the transmission opening 15, i.e., f'=T is satisfied to the substrate thickness T. In the case of an aspheric lens, the best image point position is made to come to the focal position. In such a case, it is possible to maximize the quantity of light which penetrates the opening by determining the curvature radius of the lens by use of Equation (5) so that $f=T/n_2$ is satisfied to the substrate thickness T. Here, although the above-mentioned argument gives no consideration to the fact that the light is obliquely emitted from the backlight 59, it applies without especially making any changes as long as the light does not extremely obliquely enter the lens.

Meanwhile, if lens specifications are such that the maximum quantity of transmitted light is attained, as mentioned above, the luminance rapidly changed at such an angle that the light is interrupted at the opening. Accordingly, when the lens shape (curvature radius and lens width) are fixed and the substrate made thinner than that at the best image point position obtained by Equation (5), the condensed light spot in the vicinity of the transmission opening 15 fades. Therefore, it is found possible to expand the viewing angle without substantial change of the front luminance when smooth luminance change is allowed. Then, the luminance viewing angle distribution was adjusted by adjusting the substrate thickness of the lower substrate 17. The viewing angle in this case will be described later.

When the light is emitted obliquely from the backlight 59, the y-directional position of the transmission opening 15 and the lenticular lens 1 is shifted to the inclination direction (y direction) of the light emitted from the backlight 59, so that the quantity and the luminance of the light which penetrates the transmission opening 15 have been enhanced. Practically, there are two different methods of shifting the lens position: one is to maximize the peak luminance of the light which penetrated the opening and the other is to maximize the front luminance thereof. The shift amount of the lens position in each method is described below.

Figure 7:
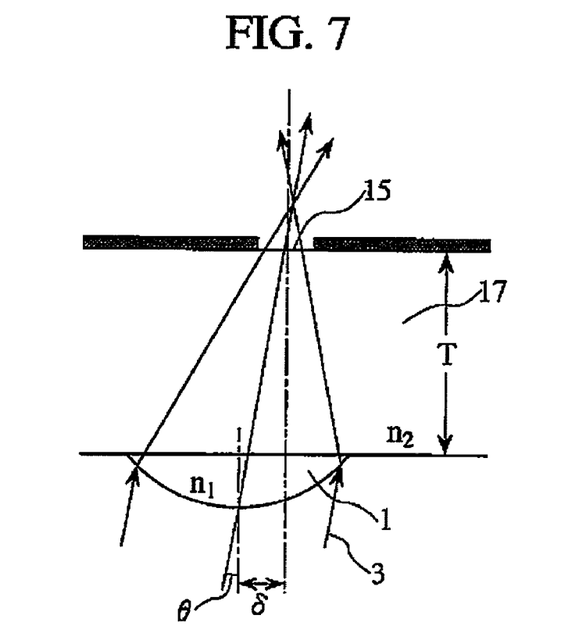
FIG. 7 is a diagram of assistance in explaining the shift amount of a transmission opening that provides the maximum peak luminance according to the first embodiment of the present invention.
Figure 8:
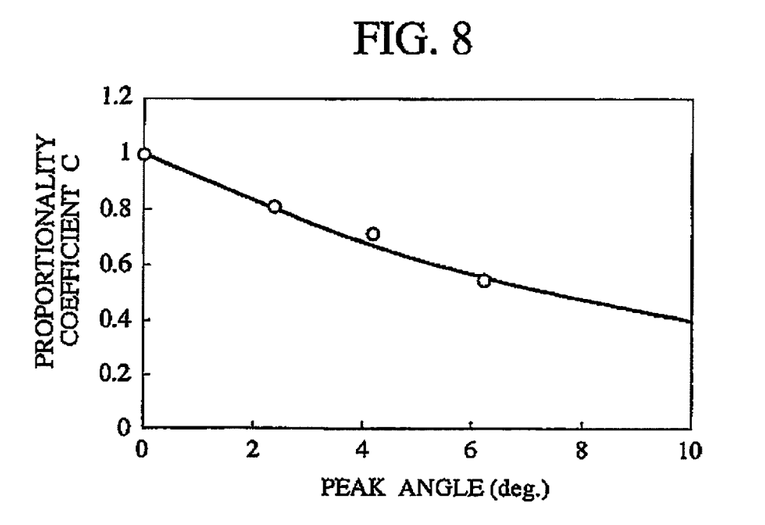
FIG. 8 is a diagram showing a relation between the peak angle of the backlight output light and the shift amount according to the first embodiment of the present invention.

When the peak luminance is to be maximized, desirably the light which entered the center of the lens with an angle θ at which the luminance of the backlight 59 is maximized passes through the center of the transmission opening 15, as shown in FIG. 7. That is, when only the light having an angle θ is taken into consideration from the geometrical point of view, a shift amount δ between the center of the lens and that of the opening is represented by the following equation:

$$\delta \cong T \tan(\theta/n_2) \quad \text{[Equation 7]}$$

where T denotes the thickness of the substrate; and $n_2$, the refractive index thereof. As a result of in-depth study of the shift amount, in the case where the light emitted from the backlight is not completely parallel and has a spread angle, it was found that the peak luminance is maximized by the shift amount δ which is smaller than the value obtained by Equation (7). A relation between the shift amount δ, the substrate thickness T, and the peak output angle θ is represented by the following equation. Then, a proportionality coefficient C is obtained and a result shown in FIG. 8:

$$\delta = CT \tan(\theta/n_2) \quad \text{[Equation 8]}$$

FIG. 8 shows that it is desirable to set the proportionality coefficient C to 1 or less and decrease the proportionality coefficient with increasing output angle θ. If the output angle θ is small, it is not necessary to shift the opening and the lens; if the output angle θ is large, the effect that will be provided by using a lens decreases even if the opening and the lens are shifted. The effect of using a lens can be sufficiently obtained by setting the output angle θ to a value between 1° and 10°, desirably between 2° and 8°. For that purpose, it is preferable to set the proportionality coefficient C to a value between 0.4 and 0.9, desirably 0.5 or more. Alternatively, the proportionality-coefficient C can be properly represented as a function of the output angle θ by the following equation:

$$C = \exp\left(-\frac{\theta}{11°}\right) \quad \text{[Equation 9]}$$

The proportionality coefficient C may be determined according to the output angle θ based on Equation (9) and then the shift amount δ may be determined by use of Equation (8).

Figure 9:
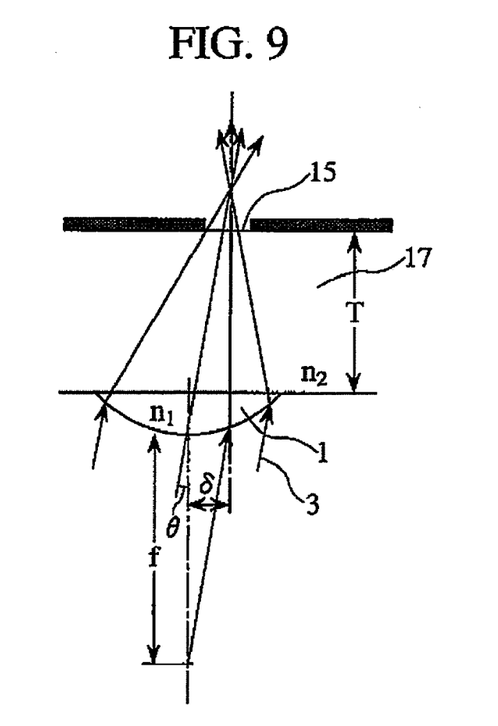
FIG. 9 is a diagram of assistance in explaining the shift amount of a transmission opening that provides the maximum front luminance according to the first embodiment of the present invention.

A condition that maximizes the front luminance is shown below. It is desirable that the incidence position of the light which passed through the focus of the lens with an angle θ coincide with the center of the transmission opening 15, as shown in FIG. 9. The shift amount δ between the center of the lenticular lens 1 and the center of the transmission opening 15 is represented by the following equation:

$$\delta \cong f \tan \theta \quad \text{[Equation 10]}$$

where f denotes the focal distance of the lens, which can be obtained by use of Equation (5) in the case of a planoconvex lens.

Figure 10:
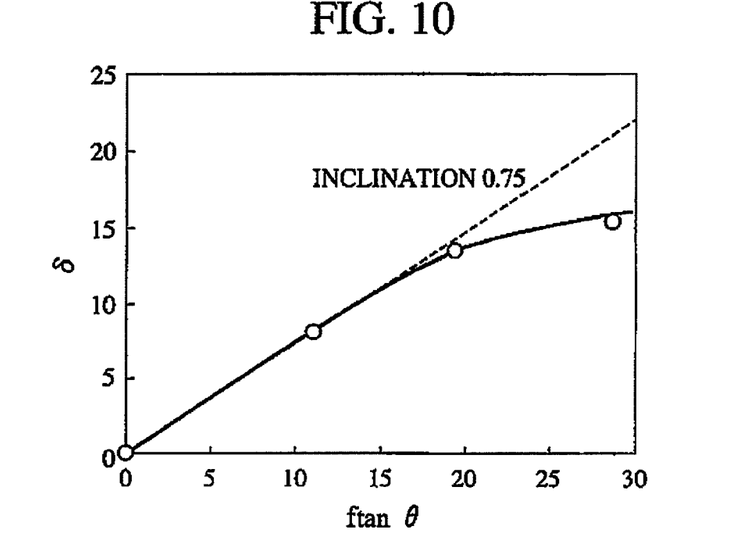
FIG. 10 is a diagram showing a relation between the peak angle of the backlight output light and the shift amount according to the first embodiment of the present invention.

Also in this case, as a result of in-depth study in the case where a backlight having a certain range of the output angle is used, it was found that the front luminance is maximized with a shift amount δ smaller than the value obtained by Equation (10) like when the peak luminance is maximized. FIG. 10 shows a relation between f tan θ and a shift amount δ which maximizes the front luminance. Also in this case, when a relation between the shift amount δ and f tan θ is represented by the following equation, the proportionality coefficient C becomes 1 or less:

$$\delta \cong Cf \tan \theta \quad \text{[Equation 11]}$$

Referring to FIG. 10, the proportionality coefficient C is equal to or smaller than 0.75 (C≦0.75), and becomes smaller than 0.75 as the output angle θ increases. In this way, the front luminance can be maximized with a proportionality coefficient C of 0.75 or less; however, when an output angle at which an effect of MLA can be obtained is taken into consideration, the front luminance can be increased with a proportionality coefficient C between 0.5 and 1, more especially, between 0.6 and 0.8. It is desirable to determine shift amount δ so as to fall within this range. Alternatively, the proportionality coefficient C can be properly represented as a function of the output angle θ by the following equation:

$$C = 0.065*(1-\exp(-(\theta/14°)^{1.5}))/\tan \theta \quad \text{[Equation 12]}$$

Therefore, the shift amount δ may be determined based on Equation (11) by using the proportionality coefficient C obtained from Equation (12).

Figure 11:
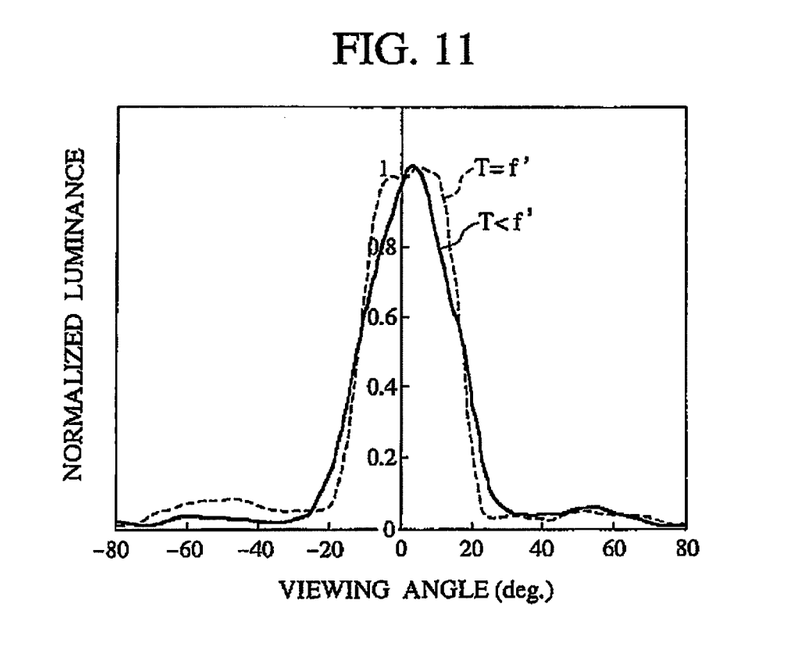
FIG. 11 is a diagram showing a viewing angle distribution according to the first embodiment of the present invention.

FIG. 11 shows a viewing angle distribution plotted when a lens shape (curvature radius and diameter) that enables to maximize the quantity of transmitted light to a predetermined substrate thickness is used, and another viewing angle distribution plotted when the lens shape condition is fixed and a substrate thickness is made thin. Here, the positions at which the transmission opening 15 and the lenticular lens 1 are disposed are shifted so as to maximize the front luminance.

In this case, under a condition where the quantity of transmitted light is maximized for a predetermined substrate thickness, the luminance hardly changes in the vicinity of the front even if the viewing angle is changed; however, it changes rapidly as the viewing angle is changed from the front. With such a viewing angle distribution, the screen of the display device can hardly be seen from a surrounding person, thus providing a remarkable effect of peek prevention.

On the other hand, if the same lens shape (curvature radius, lens width) is used and the substrate thickness is decreased (T<f), the front luminance hardly changes, providing smooth luminance change and an expanded viewing angle. Therefore, there is an effect of providing a wider viewing angle of the display device than in a case where the quantity of transmitted light is maximized. In this way, it is possible to adjust the luminance viewing angle distribution by adjusting the substrate thickness of the lower substrate 17.

Referring to FIGS. 5 and 11, by relatively shifting the positions of the transmission opening 15 and the lenticular lens 1 based on the fact that light is obliquely emitted from the backlight 59, the output angle (peak angle) of the light emitted from a liquid crystal display element through the transmission opening can be made smaller than the output angle (peak angle) of the light emitted from the backlight 59. Especially, the output angle (peak angle) of the light outputted from the liquid crystal display element can be clearly decreased when the substrate thickness is decreased (T<f).

Figure 12:
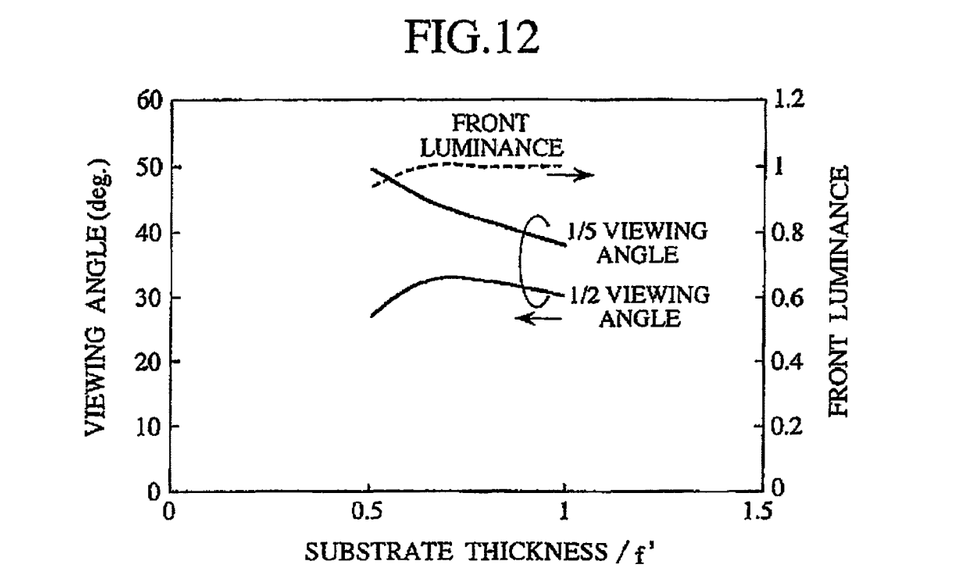
FIG. 12 is a diagram showing a relation between a substrate thickness, a viewing angle, and a front luminance according to the first embodiment of the present invention.

FIG. 12 shows how the viewing angle and the front luminance change when the substrate thickness is changed with a fixed lens shape. FIG. 12 shows two different viewing angles: a ½ viewing angle at which the luminance is a half of the peak luminance and a ⅕ viewing angle at which the luminance is ⅕ times the peak luminance. The ½ viewing angle is a commonly used viewing angle (unless otherwise specified, the term viewing angle denotes the ½ viewing angle). The ⅕ viewing angle is shown as a rough range in which the screen is bright to some extent and an image can be seen. Since the substrate thickness T is normalized by f' represented by Equation (6), when this lens is used, the quantity of transmitted light is maximized with a substrate thickness that satisfies T/f'=1. Further, the positions of the transmission opening 15 and the lenticular lens 1 are adjusted so that maximum front luminance is obtained.

As understood from FIG. 12, if T/f' is 0.6 or more, the front luminance remains substantially constant even if the substrate thickness is decreased; if it is 0.6 or less, the front luminance decreases. Further, both the ½ viewing angle and the ⅕ viewing angle increase with decreasing substrate thickness. The ½ viewing angle decreases if T/f' becomes smaller than 0.7.

Further, if T/f' becomes smaller than 0.55, the ½ viewing angle desirably becomes smaller than when T/f'=1. Therefore, if T/f' is between 0.55 and 1, the ½ viewing angle is desirably larger than when T/f'=1.

Further, if T/f' is between 0.6 and 1, the front luminance is the same as that when T/f'=1, and the viewing angle can be desirably increased. Further, the ½ viewing angle is maximized when T/f'=0.7 and therefore T/f' is between about 0.6 and 0.8. The front luminance is the same as that when T/f'=1, and the ½ viewing angle can be increased.

In this way, if the lower substrate 17 is made thin with the lens shape fixed, the quantity of light which penetrates the transmission opening 15 becomes smaller than the maximum quantity of transmitted light with the decreased substrate thickness. On the other hand, this makes it possible to increase the front luminance in comparison with a case where the curvature radius of the lens is decreased so as to obtain a maximum quantity of transmitted light to the decreased substrate thickness.

As mentioned above, by relatively shifting the positions of the transmission opening 15 and the lenticular lens 1 to the direction of the light emitted from the backlight 59 as well as by thinning the substrate of the liquid crystal display element, it is possible to obtain a smoothly changing output angle distribution of the light which penetrates the transmission opening 15 and increase the luminance in the vicinity of the front. A case where, with the lens shape fixed, the substrate thickness is changed to change the distance between the lens and the transmission opening has been mentioned above.

Figure 13:
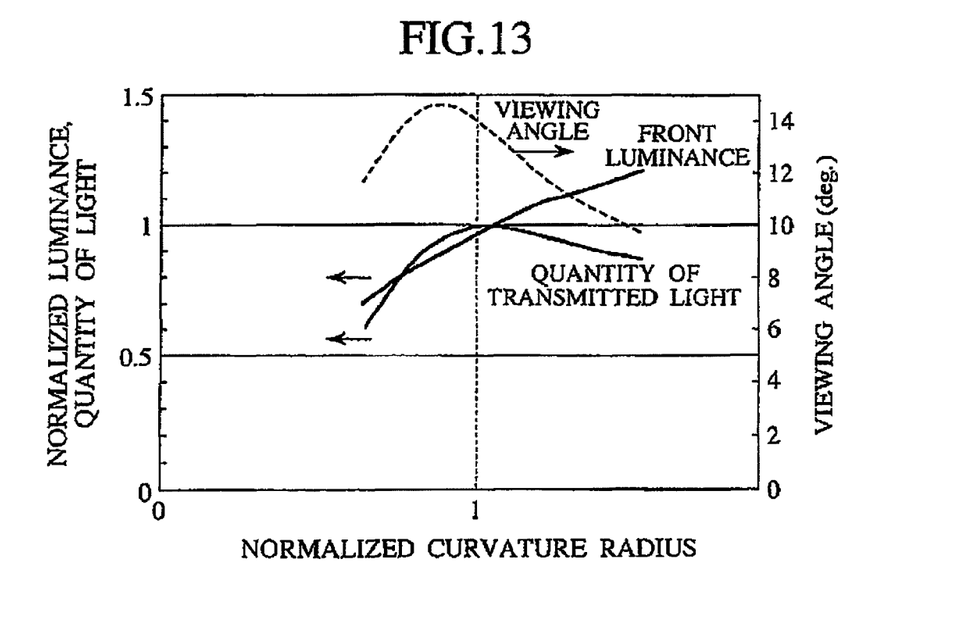
FIG. 13 is a diagram showing a relation between a curvature radius, a viewing angle, a front luminance, and a quantity of transmitted light according to the first embodiment of the present invention.

FIG. 13 shows characteristics (quantity of transmitted light, front luminance, and ½ viewing angle) when the curvature radius of the lens is changed with the substrate thickness fixed. The curvature radius is normalized in terms of the curvature radius when T=f', and the quantity of transmitted light is maximized when the normalized curvature radius is 1. If the normalized curvature radius is made larger than 1, the quantity of transmitted light and the viewing angle decrease while the front luminance increases.

Therefore, when importance is attached to the front luminance, it is desirable to increase the curvature radius. On the other hand, if the normalized curvature radius is made smaller than 1, the quantity of transmitted light and the front luminance decrease while the viewing angle once increases and then decreases. In this way, to increase the front luminance, it is desirable to decrease the curvature radius.

When the normalized curvature radius is around 0.9, the viewing angle is maximized; when it is 0.75 or larger, the viewing angle is wider than that in the case of the normalized curvature radius of 1. Therefore, in order to increase the viewing angle, it is desirable to set the normalized curvature radius to a value between 0.75 and 1.

Although the lenticular lens 1 is formed on the lower substrate 17 with the present embodiment, the lenticular lens 1 may be formed on another transmissive substrate with the orientation of the lenticular lens 1 vertically inverted. In this case, it is also possible to attach the polarizing plate 7b onto another transmissive substrate. Further, the lenticular lens 1, which is covered with a material having a different refractive index, may be embedded so that the surface thereof becomes flat. If the lenticular lens 1 is to be embedded in this way, it is desirable to attach the polarizing plate 7b to a flat surface because reflection on the surface of the lenticular lens 1 and the polarizing plate 7b can be desirably suppressed. Further, the polarizing plate 7b may be provided between the lower substrate 17 and the lenticular lens 1.

When the width, height, and curvature of the lenticular lens 1 are randomly modulated, a light diffusion function can be provided. When the width and height of the lenticular lens 1 are modulated with the curvature maintained, more desirably light diffusion characteristics can be given to the direction perpendicular to the condensing direction of the lenticular lens 1 without change of the focal distance.

Although the lenticular lens 1 is applied to a planar light-emitting element of the present embodiment because it can obtain light having a high directivity into one axis direction, the lenticular lens 1 can be applied to condense light also when favorable collimate characteristics are exhibited in all directions of the backlight. In this case, a hologram sheet, a lenticular lens sheet, a prism sheet, and a lens array sheet are provided on the output side of the liquid crystal display element 57, so that the viewing angle can be increased. Alternatively, a hologram sheet, a lenticular lens sheet, and a prism sheet may be provided between the backlight 59 and the liquid crystal display element 57 for increase of the spread angle in one axis direction. Further, when favorable collimate characteristics are exhibited in all directions, a micro lens array for sub pixels can be used instead of the lenticular lens 1. In this case, it is desirable to arrange transmission openings 15 in a lattice pattern, i.e., in so-called delta form so as to densely dispose micro lenses.

The planar light-emitting element of the present embodiment makes it possible to align the direction having a high directivity and improve the directivity in at least one axis direction in an orthogonal coordinate system. Therefore, when a condensing element, especially the lenticular lens 1, is used, the light condensing function can be sufficiently utilized.

Although the transmission opening 15 has a rectangular opening shape with the present embodiment, if the transmission opening is not a rectangular and the center thereof is not defined, the transmission opening can be regarded to coincide with the center of the lens in the case where the luminance distribution of light outputted from the opening has a peak in the front direction when the light perpendicularly enters the lower substrate 17. It is preferable to regard the shift from the positional relation in this case as a shift amount between the opening and the lens.

Further, from the viewpoint of moderating change of the viewing angle distribution, the shape of the transmission opening may be, for example, a lozenge, a trapezoid, a circle, or the like, instead of a rectangle.

Further, although the polarizing plate 7 is used with the present embodiment, it is preferable to use a circular polarizing plate instead of the polarizing plate 7 if a display mode requiring a circular polarizing plate is used. Further, a reflective polarizing plate may be provided on the side of the backlight 59 of the polarizing plate 7b such that the reflective polarizing plate reflects the polarized light in a direction in which it is absorbed by the polarizing plate 7b and returns the light to the side of the backlight 59 for reuse, so that the efficiency of utilization of light may be improved.

Since the light enters the incidence facet of the second prism sheet 41 with an angle, the reflection factor on the incidence facet of the second prism sheet 41 differs in P polarization and S polarization and therefore the light emitted from the second prism sheet 41 is polarized so as to contain a number of P polarization components. Therefore, it is desirable to determine the direction of the polarizing plate 7b in relation to the polarizing direction. Further, if the direction of the polarizing plate 7b cannot be adjusted, it is also possible to give a double refraction index to the second prism sheet 41 to cancel polarization.

In order to prevent moire between prisms of the first prism sheet 39 and the second prism sheet 41 and a pixel of the liquid crystal display element, it is desirable to decrease the pitch of prisms to such an extent that a plurality of prisms fit into a pixel of the liquid crystal display element. Especially with the second prism sheet 41, it is desirable to set the pitch to three or more prisms per lens.

A second embodiment of the present invention will be explained below with reference to FIGS. 14 to 16. Since the second embodiment is the same as the first embodiment except that the light diffusion layer 61 is provided, differences therebetween will be mainly explained.

Figure 14:
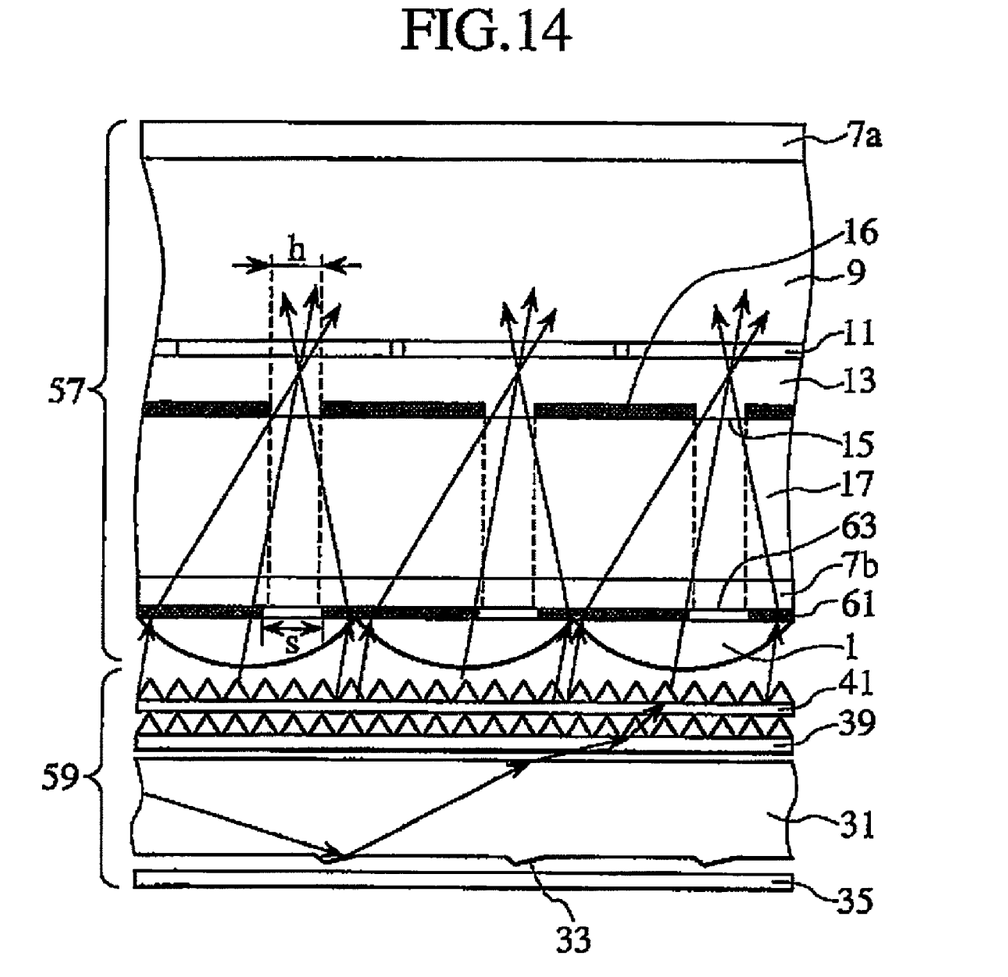
FIG. 14 is a sectional view of a second embodiment of an image display device according to the present invention.
Figure 15:
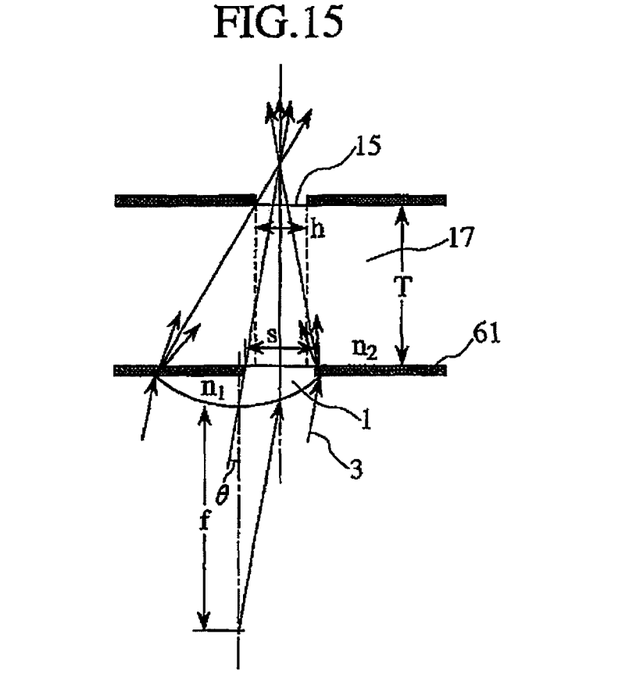
FIG. 15 is a diagram of assistance in explaining a function of a light diffusion layer according to the second embodiment of the present invention.

FIG. 14 shows a sectional view of the planar light-emitting element and the liquid crystal display device that constitute a liquid crystal display element. With the present embodiment, the polarizing plate 7b is attached to the lower substrate 17, and the light diffusion layer 61 is formed thereon. The light diffusion layer 61 is provided with light diffusion layer openings 63 not having light diffusion characteristics in association with the transmission openings 15. The lenticular lenses 1 are formed on the light diffusion layer 61. Here, the light diffusion layer 61 and the lenticular lens 1 are formed through print-based patterning. First of all, the light diffusion layer 61 is printed and then hardened so that the light diffusion layer opening 63 is aligned with the transmission opening 15. Light diffusion characteristics is given to the light diffusion layer 61 by distributing microstructures having different base materials, such as inorganic fine particles (for example, $TiO_2$), polymer fine particle, or the like, and refractive indices. If the refractive index of the light diffusion layer 61 differs from that of the lenticular lens 1, irregularity may be provided on the surface of the light diffusion layer 61 to give light diffusion characteristics. Subsequently, the lenticular lens 1 is printed and hardened on the light diffusion layer 61. The shape of the lenticular lens 1 can be stably formed if the wettability of the light diffusion layer 61 and the lens material are properly controlled.

Each of the light diffusion layer openings 63 facing each of the transmission openings 15 is made larger than each of the transmission openings 15. Specifically, a condition h<s is satisfied where h denotes the width of the transmission opening; and s, the width of the light diffusion layer opening 63, as shown in FIG. 15.

Thus, the light which was condensed by the lenticular lens 1 and penetrated in the front direction from the transmission opening 15 penetrates the liquid crystal display element 57 without being affected by the light diffusion layer 61. Therefore, this effect is substantially the same as that obtained in the case where the light diffusion layer 61 is not formed. On the other hand, the light which penetrates the light diffusion layer 61 is scattered by the light diffusion layer 61 and therefore the distribution of the light which penetrates the transmission opening 15 is changed, thus increasing components having a large angle.

Figure 16:
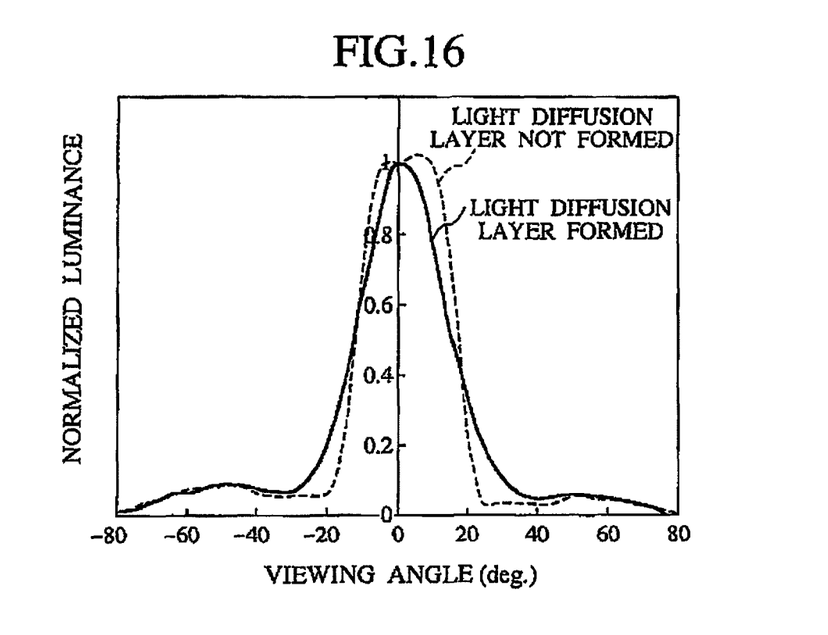
FIG. 16 is a diagram showing a viewing angle distribution of the second embodiment of the present invention.

As a result, when the light diffusion layer 61 is formed the viewing angle distribution becomes smooth and the skirt thereof spreads without changing the front luminance, making it possible to view the screen with a wide range of viewing angles, as shown by the viewing angle distribution in FIG. 16. The light diffusion layer 61 can be regarded to have light diffusion characteristics when the viewing angle, especially the ⅕ viewing angle is enlarged, as compared with a case where the light diffusion layer 61 is not formed.

The position where the light diffusion layer 61 is to be disposed is not limited to the present embodiment. The light diffusion layer 61 may be formed between the lenticular lens 1 and the transmission opening 15. The light diffusion layer 61 may be formed in contact with the side of the backlight 59 of the lower substrate 17. The light diffusion layer 61 may be formed on the side of the liquid crystal layer 13 of the lower substrate 17. The lenticular lens 1 and the light diffusion layer 61 need not be always formed in contact with each other; however, it is desirable to form them in contact with each other because this state makes it possible to control the wettability of the light diffusion layer 61 and the lens material, thus stably forming the shape of the lenticular lens 1.

Further, the contrast of the liquid crystal display device can be maintained high by providing the light diffusion layer 61 between the lenticular lens 1 and the polarizing plate 7b.

Although the present embodiment has been explained using a transflective liquid crystal display element, the present invention is not limit thereto and it can also be applied to a transmissive liquid crystal display element in the same manner.

Further, although the embodiments explained above use LEDs as a light source, a linear light source, such as a cold cathode fluorescence lamp (CCFL), can also be used as a light source. Further, also when LEDs are used, the number of LEDs is not limited.

Further, the display mode of the liquid crystal display element 57 is not limited with the present embodiment, and the IPS mode (In Plane Switch), the VA mode (Vertical Alignment), the TN mode (Twist Nematic), or the like may be suitably applied.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid crystal display device comprising:
a pair of substrates;
a pair of polarizing plates which sandwiches the pair of substrates;
a liquid crystal layer sandwiched by the pair of substrates;
transmission openings formed in a pixel to limit the quantity of light which penetrates the liquid crystal layer;
condensing elements formed on the side of one of the substrates, opposite to the side on which the liquid crystal layer is disposed, to condense light to the transmission openings; and
a planar light-emitting element which emits light to be applied to the condensing elements;
wherein the light to be emitted from the planar light-emitting element forms a certain angle with respect to a perpendicular of the planar light-emitting element when emitted;
wherein the position of the transmission opening is relatively shifted with respect to that of the condensing element so as to increase the quantity of light which penetrates the transmission opening, in association with a light-emitting direction of the planar light-emitting element,
wherein a light output angle of the planar light-emitting element at a peak luminance is tilted at an angle θ with respect to the perpendicular of the planar light-emitting element, the angle θ being more than 0 degree, and
wherein a shift amount δ between a center of the transmission opening and a center of the condensing element is represented by the following equation, $$\delta \approx C_1 T \tan(\theta/n_2),$$

where T denotes a thickness of one of the pair of substrates, disposed on the side of the planar light-emitting element; $n_2$ is a refraction index of the one of the pair of substrates; and $C_1$ is a coefficient ranging between 0.4 and 1.

2. The liquid crystal display device according to claim 1, wherein:
a focal distance f of the condensing element is represented by the following equation, $$\delta \approx C_2 f \tan \theta,$$

wherein $C_2$ is a coefficient ranging between 0.5 and 1.

3. The liquid crystal display device according to claim 1, wherein:
the transmission openings are provided closer to the side of the condensing elements than a best condensing position, the best condensing position being a position at which the diameter of a condensed light spot is minimized when parallel light vertically enters the condensing element.

4. The liquid crystal display device according to claim 1, wherein:
the angle θ is between 1 and 10 degrees.

5. A liquid crystal display device according to claim 1, wherein the planar light-emitting element comprises a plurality of prism sheets having different prism bottom angles.

6. A liquid crystal display device according to claim 1, wherein a light-emitting angle of the liquid crystal display element is smaller than that of the planar light-emitting element.

7. A liquid crystal display device according to claim 1, wherein when f' denotes a distance from a best condensing position to the condensing element, at which the diameter of a condensed light spot is minimized when parallel light perpendicularly enters the condensing element, T/f is between 0.55 and 0.8 and a wider viewing angle is provided than when T/f is 1.

8. The liquid crystal display device according to claim 1, wherein:
the condensing elements are formed as lenticular lenses.

9. The liquid crystal display device according to claim 1, wherein:
the condensing elements are formed on one of the pair of polarizing plates.

10. The liquid crystal display device according to claim 1, wherein a spread angle of the planar light-emitting element is no greater than ±7 degree.

11. The liquid crystal display device according to claim 10, wherein the center of the transmission openings is positioned closer to the center of the condensing elements than the light entering the center of the condensing elements at the angle θ and passing through the transmission openings.

12. The liquid crystal display device according to claim 1, wherein the condensing elements are arranged in overlapping relation with the transmission openings, and the shift amount is between the center of the transmission opening and the center of the overlapping condensing element.

13. A liquid crystal display device comprising:
a pair of substrates;
a pair of polarizing plates which sandwich the pair of substrates;
a liquid crystal layer sandwiched by the pair of substrates;
transmission openings formed in a pixel to limit the quantity of light which penetrates the liquid crystal layer;
condensing elements formed on the side of one of the substrates, opposite to the side on which the liquid crystal layer is disposed, to condense light to the transmission openings;
a planar light-emitting element which emits light to be applied to the condensing elements; and
a light diffusion layer disposed between the transmission openings and the condensing elements.

14. The liquid crystal display device according to claim 13, wherein:
the light diffusion layer includes light diffusion layer openings not having light diffusion characteristics in association with the transmission openings; and
each of the light diffusion layer openings is larger than each of the transmission openings.

15. The liquid crystal display device according to claim 14, wherein:
the condensing elements are formed in contact with the light diffusion layer.

16. A liquid crystal display device comprising:
a pair of substrates;
a pair of polarizing plates which sandwiches the pair of substrates;
a liquid crystal layer sandwiched by the pair of substrates;
transmission openings formed in each of a plurality of pixels to limit the quantity of light which penetrates the liquid crystal layer;
condensing elements formed on the side of one of the substrate, opposite to the side on which the liquid crystal layer is disposed, in overlapping relation with at least a center of the transmission openings so as to condense light to the transmission openings; and
a planar light-emitting element which emits light to be applied to the condensing elements,
wherein light having a highest intensity to be emitted from the planar light-emitting element forms a certain angle with respect to a perpendicular of the planar light-emitting element; and
wherein the center of the transmission openings with respect to a center of the overlapping condensing elements as a reference, is shifted to a position in which the light of the planar light-emitting element having the highest intensity is tilted.

17. The liquid crystal display device according to claim 16, wherein the respective condensing elements formed in overlapping relation with the respective transmission openings are formed adjacent each other.

* * * * *